Oct. 18, 1960  T. I. HARRIS ET AL  2,956,475
WIDE ANGLE LENS ATTACHMENT
Filed July 21, 1958  2 Sheets-Sheet 1
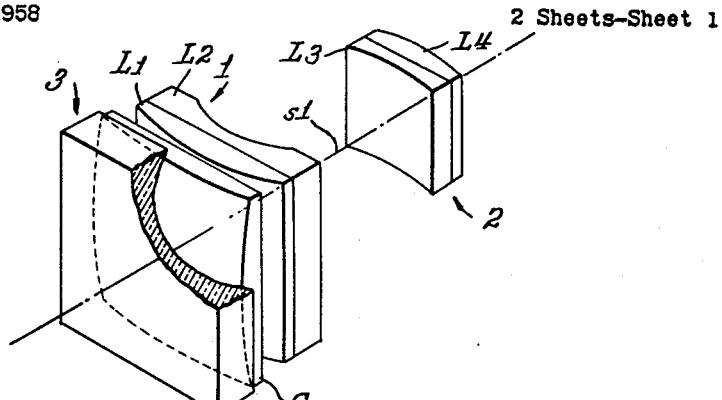
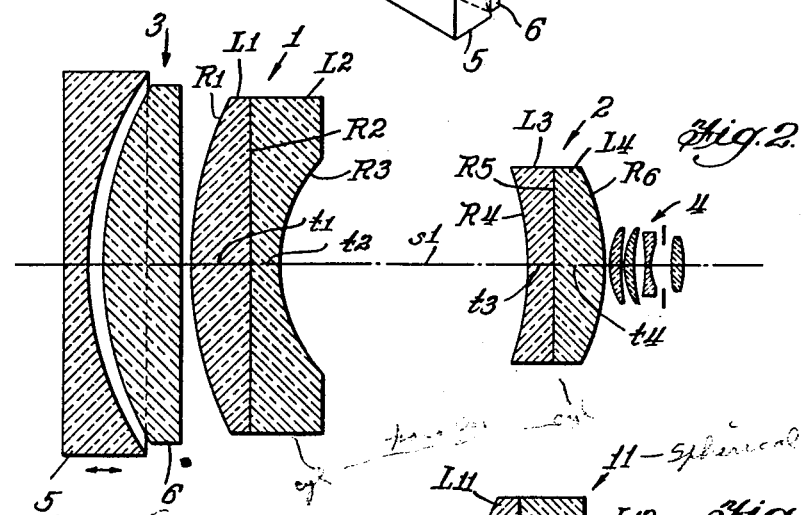
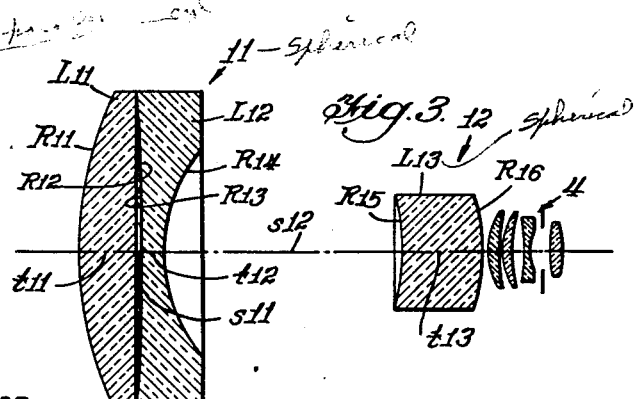
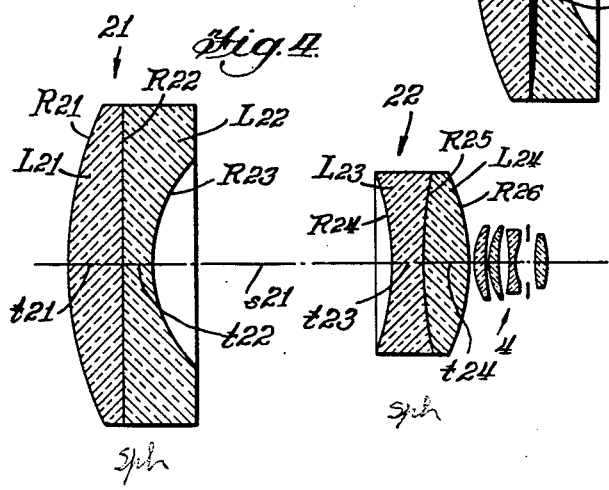
Inventors:
Thomas I. Harris
Walter J. Johnson
Irving C. Sandback
BY
Robert H. Muller Atty

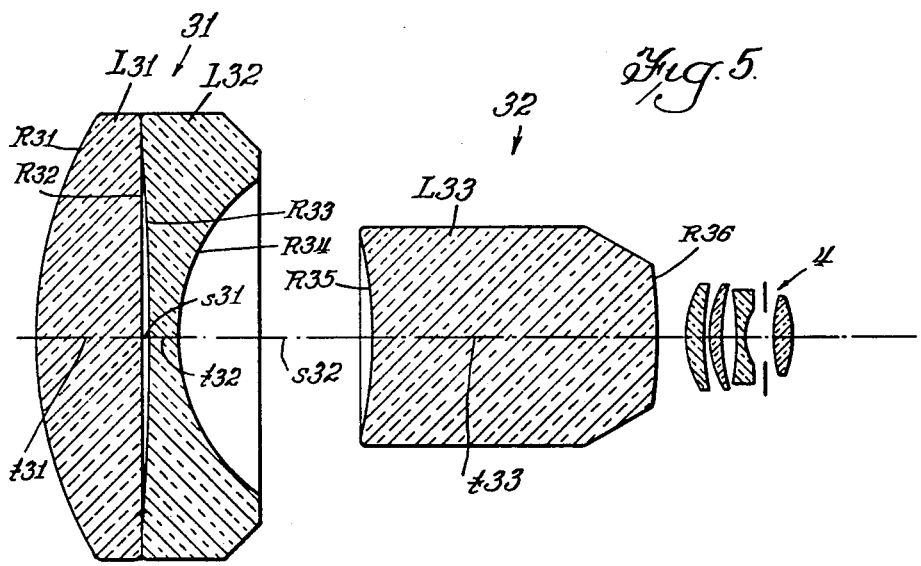

ature of the convex surface R₆ of the positive

United States Patent Office 2,956,475
Patented Oct. 18, 1960

2,956,475

WIDE ANGLE LENS ATTACHMENT

Thomas I. Harris and Walter J. Johnson, Mundelein, and Irving C. Sandback, Morton Grove, Ill., assignors to Bell & Howell Company, Chicago, Ill., a corporation of Illinois Filed July 21, 1958, Ser. No. 750,023

1 Claim. (Cl. 88—57)

This invention relates to a lens system, and more particularly to wide angle lens attachments primarily intended for photographic and projection purposes but not limited to this use alone.

It is an object of the invention to provide an afocal optical system for use with a standard type prime lens to provide an optical system shorter in focal length than that of the prime lens by a factor of two-thirds.

Another object of the invention is to provide a wide angle lens attachment adapted to be attached to the front lens and having two components of which the first or front component is compound and of a negative meniscus shape concave to the prime lens and the second component is a positive meniscus convex to the prime lens and so shaped and composed as to attain a flat tangential field and a high degree of correction as to spherical aberration and coma and also attain a high overall degree of correction.

A further object of the invention is to provide a wide angle lens attachment in which front and rear components are present with the front component comprising a high power doublet optically corrected lens with the rear component consisting of a thick lens to reduce the overall length and diameter of the system and weaken the curvatures of the rear component. The rear component also may be a doublet either air spaced or cemented.

A still further object of the invention is to provide an anamorphic wide angle attachment having front, intermediate and rear components in which the front is a spherical focusing doublet, the intermediate component is a strongly negative cylindrical meniscus doublet and the rear component is a positive component of weaker power than that of the intermediate component, all corrected optically.

Another object of the invention is to provide a wide angle lens attachment for a camera objective and constituting an improvement over attachments of the Berthiot type marketed under the trade name "Hyper Cinor" by the Bell & Howell Company and that shown in Bennett Patent 2,324,057.

The invention will be better understood by reference to the accompanying drawing forming a part hereof, in which—

Fig. 1 is a perspective view, partly in section of an afocal anamorphic lens system forming one embodiment of the invention;

Fig. 2 is a horizontal section of the lens system shown in Fig. 1 together with a primary lens system with which the afocal lens system may be used;

Fig. 3 is a horizontal section of a spherical lens system forming an alternate embodiment of the invention together with a primary lens system with which the spherical lens system may be used;

Fig. 4 is a horizontal section of a spherical lens system forming a further embodiment of the invention with a primary lens system with which the spherical lens system may be used;

Fig. 5 is a horizontal section of a spherical lens system constituting another embodiment of the invention together with a primary lens system with which the spherical lens system may be used.

The invention provides a wide angle afocal lens attachment for the primary lens of a camera or a projector. The attachment in one embodiment may be an anamorphic lens system having a front component comprising an air spaced spherical focusing doublet and a front cemented negative meniscus cylindrical doublet of high power together with a weaker rear cylindrical positive meniscus doublet concave to the first doublet. The negative meniscus cylindrical doublet is corrected for chromatic aberrations and the radii of its surfaces are such as to correct spherical aberration and coma and provide a flat tangential field and the rear component is similarly corrected. The rear component may also be a single element with an increase of thickness to reduce the overall diameter of the system and also weaken its own curvatures. The attachment described above also may be a completely spherical lens system with the above cylindrical elements replaced by spherical elements.

It is to be understood that the terms "front" and "rear" as herein used refer respectively to the lefthand and righthand of the lens system, and the light is taken as coming from the left as viewed in the drawings for purposes of signs of the optical surfaces.

Referring to Figs. 1 and 2 of the drawings, an anamorphosing lens attachment is shown in operative position with a known standard primary lens system or photographic objective 4. The attachment comprises an adjustable two lens focusing component 3 in front of a wide angle lens system comprising a front, cylindrical, cemented, negative meniscus, doublet component 1 along with a rear cylindrical, cemented positive meniscus doublet component 2 which is shown as a positive meniscus doublet. The component 1 has cylindrical lenses $L_1$ and $L_2$ having optical surfaces $R_1$ to $R_3$ and is spaced substantially from the component 2, which has cylindrical lenses $L_3$ and $L_4$ and optical surfaces $R_4$ to $R_6$. The focusing component 3 is of known construction with a spherical front lens 5 adjustable relative to a spherical rear lens 6 thereof.

The doublets 1 and 2 have the cylindrical surfaces $R_1$, $R_3$, $R_4$ and $R_6$ disposed in parallelism and which are respectively of relatively short and long focal lengths and are spaced axially of the system a distance equal to the difference between their focal lengths, the attachment being focused for infinity. Further, the radius of curvature of the concave surface $R_3$ of the negative meniscus doublet 1 should be and is between .3 and .9 of the radius of curvature of the convex surface $R_6$ of the positive component 2 in order to attain a high degree of correction as to spherical aberration, coma, and a flat tangential field. The radius of curvature of the surface $R_3$ also is between .25 and .5 of that of the surface $R_1$ to attain a high overall degree of correction of the system.

The radius of curvature of the concave surface $R_4$ of the doublet 2 should be and is between .3 and .5 of the radius of curvature of its convex surface $R_6$ in order to attain a high degree of chromatic correction of the component 2 together with a high overall correction of the system. The axial separation $s_1$ of the components 1 and 2 should be and is between 1.0 and 1.3 of the radius of curvature of the convex surface $R_6$ of the positive meniscus doublet component 2, the attachment being focused for infinity, in order to obtain a high degree of simultaneous correction of the aberrations.

Each of the components has a high degree of chromatic correction with the small residual amount of one component being canceled by an amount of opposite sign in the other component. This requires a choice of crown and flint glass for the lenses of both doublets such that the difference in Abbe value V, between crown and flint lies in the range of from 20 to 26.

A preferred construction of the lens attachment shown in Figs. 1 and 2 conforms substantially with the following table in which dimensions are in terms of inches, and in which the indices of refraction for the D line and the Abbe dispersion numbers are respectively designated at $n_d$ and V:

| | | | | |
|---|---|---|---|---|
| $L_1$ | $R_1 = +1.481$ | $t_1 = .220$ | $n_d = 1.649$ | $V = 33.8$ |
| | $R_2 = $ Plano | | | |
| $L_2$ | | $t_2 = .110$ | $n_d = 1.523$ | $V = 58.5$ |
| | $R_3 = +.576$ | | | |
| | | $s_1 = .962$ | | |
| | $R_4 = -1.099$ | | | |
| $L_3$ | | $t_3 = .110$ | $n_d = 1.649$ | $V = 33.8$ |
| | $R_5 = $ Plano | | | |
| $L_4$ | | $t_4 = .200$ | $n_d = 1.637$ | $V = 55.5$ |
| | $R_6 = -.834$ | | | |

In the embodiment shown in Fig. 3, the wide angle attachment includes a spherical negative front air separated or edge contact doublet 11 together with a spherical singlet lens $L_{13}$ of such a thickness and so spaced that the physical diameter of the doublet 11 may be small. The doublet 11 includes lenses $L_{11}$ and $L_{12}$ and is a front component of weak negative power.

The lenses $L_{11}$, $L_{12}$ and $L_{13}$ have respective radii $R_{11}$ to $R_{16}$ as shown on the drawing, thicknesses $t_{11}$ to $t_{13}$, and axial separations $s_1$ and $s_2$. The thickness of the lens $L_{13}$ is such that the surfaces $R_{15}$ and $R_{16}$ are spaced apart for infinity focus of the attachment to present the virtual image properly to the prime lens 4, and the surface $R_{15}$ is sufficiently close to the lens $L_{12}$ that all the light from the lens $L_{12}$ travels to the lens $L_{13}$ as is known in the art. This thickness of the lens $L_{13}$ permits the outer diameter of the lenses $L_{11}$ and $L_{12}$ to be maintained at a minimum since the surface $R_{15}$ is as close as possible to the lens $L_{12}$ while being so spaced from the surface $R_{16}$ that the desired virtual image is transmitted to the objective 4.

The first component 11 is comprised of two elements, which may be cemented or may be an air spaced edge contact doublet in order to provide correction for chromatic aberrations, and is shown in the latter form. The difference in Abbe numbers of the lenses $L_{11}$ and $L_{12}$ must be at least 10 to balance chromatic aberrations. The radius of curvature of the concave surface $R_{14}$ of this component should be between .3 and .9 of the radius of curvature of the convex surface $R_{16}$ of the positive component $L_{13}$ in order to attain a high degree of correction as to spherical aberration, coma, and a flat tangential. The radius of curvature of the concave surface $R_{14}$ of the component $L_{11}$ also is between .25 and .5 of the radius of curvature of its convex surfaces $R_{11}$ to attain a high, overall degree of correction of the system. The axial separation $s_{12}$ should be between .35 and 1.3 of the radius of curvature $R_{16}$ of the lens $L_{13}$, and the axial thickness $t_{13}$ should be and is between .3 and .95 of the radius $R_{16}$. In order to permit the second component 12 to be a single element, the glasses of the first component 11 are chosen to correct color aberration and provide power distribution with the above limits. The relative power distribution of the components 11 and 12 is the same as that of the components 1 and 2.

In a preferred example of lens attachment shown in Fig. 3, the construction conforms with the following table in which dimensions are in terms of inches and in which the indices of refraction for the D line and the Abbe dispersion numbers are respectively designated at $n_d$ and V:

| | | | | |
|---|---|---|---|---|
| $L_{11}$ | $R_{11} = +1.092$ | $t_{11} = .200$ | $n_d = 1.645$ | $V = 48.0$ |
| | $R_{12} = \infty$ | $s_{11} = .0013$ | | |
| $L_{12}$ | $R_{13} = -94.002$ | $t_{12} = .070$ | $n_d = 1.517$ | $V = 64.5$ |
| | $R_{14} = +.388$ | | | |
| | | $s_{12} = .664$ | | |
| | $R_{15} = -.817$ | | | |
| $L_{13}$ | | $t_{13} = .1975$ | $n_d = 1.589$ | $V = 61.0$ |
| | $R_{16} = -.568$ | | | |

In Fig. 4 there is shown a wide angle spherical lens attachment forming a further embodiment of the invention and in which both front component 21 and rear component 22 are compounded to effect an even higher correction of higher order aberrations. The component 21 is of cemented doublet construction having lenses $L_{21}$ and $L_{22}$ and the rear component also is a cemented doublet of lenses $L_{23}$ and $L_{24}$. While the doublets 21 and 22 are disclosed to be of the cemented type, either or both may be of the air separated, edge contact type to provide an even higher degree of correction. The attachment shown in Fig. 4 has the same relative power distribution as that of Fig. 3.

A preferred example of the embodiment shown in Fig. 4 conforms with the following table in which dimensions are in terms of inches, and in which the indices of refraction for the D line and the Abbe dispersion numbers are respectively designated at $n_d$ and V:

| | | | | |
|---|---|---|---|---|
| $L_{21}$ | $R_{21} = +1.995$ | $t_{21} = .210$ | $n_d = 1.689$ | $V = 30.9$ |
| | $R_{22} = \infty$ | | | |
| $L_{22}$ | | $t_{22} = .130$ | $n_d = 1.523$ | $V = 58.5$ |
| | $R_{23} = +.691$ | | | |
| | | $s_{21} = 1.0892$ | | |
| | $R_{24} = -1.559$ | | | |
| $L_{23}$ | | $t_{23} = .150$ | $n_d = 1.580$ | $V = 41.0$ |
| | $R_{25} = +2.500$ | | | |
| $L_{24}$ | | $t_{24} = .213$ | $n_d = 1.611$ | $V = 58.8$ |
| | $R_{26} = -1.110$ | | | |

The embodiment shown in Fig. 5 comprises a wide angle spherical lens attachment which has an extremely wide angle of acceptance and is of small peripheral diameter while being of short overall length. This attachment includes a front doublet component 31 and a rear single component 32 extremely thick and spaced close to the lens $L_{32}$. The front component 31 is made up of lenses $L_{31}$ and $L_{32}$ forming an air separated, edge contact doublet, and forms a corrected, negative meniscus. The lens $L_{33}$ of component 32 forms a long glass light path and is spaced closely to the component 31 so that the component 31 may have a wide angle of acceptance and also may be small in peripheral diameter.

The concave surface $R_{34}$ of the negative component 31 should be and is between .3 and .9 of the convex radius of curvature $R_{36}$ of the lens $L_{33}$. The axial separation $s_{32}$ of the negative and positive components 31 and $L_{33}$ should be and is between .35 and 1.3 of the convex radius of curvature $R_{36}$ of the positive component $L_{33}$. The axial thickness $t_{33}$ of the lens $L_{33}$ should be and is between .3 and .95 of the convex radius of curvature $R_{36}$ of the positive component. In order to maintain a reduced front diameter thereby keeping the overall bulk at a minimum, the shorter end of the separation range and the longer end of the positive component thickness range is required. However, the opposite end of this range, that is long separation and short positive component $L_{33}$ thickness, provides weaker radii and offers greater savings in mass fabrication, but necessarily increase the overall space requirement of the complete system.

A preferred example of the embodiment shown in Fig. 5 conforms with the following table in which dimensions are in terms of inches, and in which the indices of refraction for the D line and the Abbe dispersion numbers are respectively designated at $n_d$ and V:

| | | | | |
|---|---|---|---|---|
| $L_{31}$ | $R_{31}=+.826$ $R_{32}=\infty$ | $t_{31}=.175$ $s_{31}=.0009$ | $n_d=1.651$ | $V=55.8$ |
| $L_{32}$ | $R_{33}=-94.200$ $R_{34}=+.3525$ | $t_{32}=.070$ $s_{32}=.3202$ | $n_d=1.517$ | $V=64.5$ |
| $L_{33}$ | $R_{35}=-.826$ $R_{36}=-.7125$ | $t_{33}=.600$ | $n_d=1.589$ | $V=61.0$ |

The above described wide angle attachments are highly corrected, and compact, while being simple and inexpensive in construction. The attachments shown in Figs. 3, 4 and 5, while described as of the spherical type, may also be of the cylindrical type while that shown in Figs. 1 and 2 may be of the spherical type as well as of the cylindrical type shown.

While the invention is thus described, it is not wished to be limited to the precise details described, as changes may be readily made without departing from the spirit of the invention.

What is claimed is:

In a wide angle lens attachment, a front negative meniscus air separated doublet, and a rear positive meniscus singlet, and further characterized in that said attachment complies substantially with the following table in which dimensions are in terms of inches and beginning with the front end of the attachment $L_{31}$ and $L_{33}$ designate the lenses, $R_{31}$ to $R_{36}$ the radii of curvature of the optical surfaces, $t_{31}$ to $t_{33}$ the axial thicknesses, $s_{31}$ and $s_{32}$ the axial separations, $n_d$ the refractive indices for the D line and V the Abbe dispersion numbers:

| | | | | |
|---|---|---|---|---|
| $L_{31}$ | $R_{31}=+.826$ $R_{32}=\infty$ | $t_{31}=.175$ $s_{31}=.0009$ | $n_d=1.651$ | $V=55.8$ |
| $L_{32}$ | $R_{33}=-94.200$ $R_{34}=+.3525$ | $t_{32}=.070$ $s_{32}=.3202$ | $n_d=1.517$ | $V=64.5$ |
| $L_{33}$ | $R_{35}=-.826$ $R_{36}=-.7125$ | $t_{33}=.600$ | $n_d=1.589$ | $V=61.0$ |

References Cited in the file of this patent

UNITED STATES PATENTS

| | | |
|---|---|---|
| 1,932,082 | Newcomer | Oct. 24, 1933 |
| 1,934,561 | Rayton | Nov. 7, 1933 |
| 2,263,024 | Wood | Nov. 18, 1941 |
| 2,317,790 | Mellor | Apr. 27, 1943 |
| 2,324,057 | Bennett | July 13, 1943 |
| 2,582,085 | Tolle | Jan. 8, 1952 |
| 2,752,821 | Cook | July 3, 1956 |
| 2,811,080 | Harter et al. | Oct. 29, 1957 |

FOREIGN PATENTS

| | | |
|---|---|---|
| 748,910 | Great Britain | May 16, 1956 |